(12) United States Patent
Tegethoff

(10) Patent No.: US 7,304,751 B2
(45) Date of Patent: Dec. 4, 2007

(54) APPARATUS AND METHOD FOR AUTOMATICALLY MEASURING CHARACTERISTICS OF A HARD DISK DRIVE CARRIAGE ARM

(75) Inventor: Alan Tegethoff, San Jose, CA (US)

(73) Assignee: Hitachi Global Storage Technologies Neterlands B.V., Amsterdam (NL)

( * ) Notice: Subject to any disclaimer, the term of this patent is extended or adjusted under 35 U.S.C. 154(b) by 300 days.

(21) Appl. No.: 10/956,800

(22) Filed: Sep. 30, 2004

(65) Prior Publication Data

US 2006/0072103 A1   Apr. 6, 2006

(51) Int. Cl.
*G01B 11/28* (2006.01)

(52) U.S. Cl. .................. 356/630; 33/555; 360/78.09; 360/77.04

(58) Field of Classification Search .................. 356/73, 356/630–632; 33/832, 551, 784, 511, 512, 33/811, 794, 555; 360/78.09, 77.04
See application file for complete search history.

(56) References Cited

U.S. PATENT DOCUMENTS

| | | | | |
|---|---|---|---|---|
| 3,649,820 A * | 3/1972 | Totsuka et al. | ............. | 702/162 |
| 3,805,393 A * | 4/1974 | Lemelson | .................... | 33/555 |
| 3,947,881 A * | 3/1976 | Dahill et al. | ............. | 360/78.09 |
| 5,075,979 A * | 12/1991 | Foskett | .................... | 33/501.02 |
| 6,898,047 B2 * | 5/2005 | Shishida et al. | ......... | 360/77.04 |
| 2006/0002782 A1 * | 1/2006 | Elwell | ....................... | 411/57.1 |

\* cited by examiner

*Primary Examiner*—Hoa Q. Pham

(57) ABSTRACT

An apparatus and method for automatically measuring characteristics of a hard disk drive carriage arm. The method provides a first measuring device for automatically measuring a first side of a carriage arm. A second measuring device for automatically measuring a second side of the carriage arm is also provided. The second measuring device operates in conjunction with the first measuring device to cancel a measurement contact bias. Measurement data from the first measuring device and the measurement data from the second measuring device are provided to a computing device, wherein the measurement data is automatically stored and manipulated by the computing device.

21 Claims, 5 Drawing Sheets

APPARATUS AND METHOD FOR AUTOMATICALLY MEASURING CHARACTERISTICS OF A HARD DISK DRIVE CARRIAGE ARM

TECHNICAL FIELD

The present invention relates to the field of hard disk drive development, and more particularly to an apparatus and method for automatically measuring characteristics of a hard disk drive carriage arm.

BACKGROUND ART

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 40 years ago and resembles a phonograph. That is, the hard drive model includes a storage disk or hard disk that spins at a standard rotational speed. An actuator arm or slider is utilized to reach out over the disk. The arm has a magnetic read/write transducer or head for reading/writing information to or from a location on the disk. The complete assembly, e.g., the arm and head, is called a head gimbal assembly (HGA). Upon the completion of the HGA the next step is the process is the completion of the head stack assembly (HSA) in which the carriage is integrated with the HGA. The HAS is then merged with the disks. Finally, the entire device is packaged for use as a hard disk drive (HDD) assembly.

In operation, the hard disk is rotated at a set speed via a spindle motor assembly having a central drive hub. Additionally, there are channels or tracks evenly spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the year's refinement of the disk and the head have provided great reductions in the size of the hard disk drive. For example, the original hard disk drive had a disk diameter of 24 inches. Modern hard disk drives are much smaller and include disk diameters of less than 2.5 inches (micro drives are significantly smaller than that). Refinements also include the use of smaller components and laser advances within the head portion. That is, by reducing the read/write tolerances of the head portion, the tracks on the disk can be reduced in size by the same margin. Thus, as modern laser and other micro recognition technology are applied to the head, the track size on the disk can be further compressed.

However, the decreased track spacing and the overall reduction in component size and weight has resulted in problems with respect to the interaction of the disk (or disks) and the carriage arm(s) (e.g., the suspension and head attached thereto). For example, since the head portion, attached via the suspension to the carriage arm, is located so close to the disk, any faults with respect to the carriage arm (e.g., thickness, pitch or roll) can cause detrimental errors to the head portion including unstable flight and/or loss of alignment with the track it is reading from or writing to.

One solution to the problem of the carriage arm alignment is to measure the carriage arm using a two-datum line method. However, a two-datum line method will not correctly identify roll or pitch versus thickness, in order to resolve the two-datum line discrepancy, a second visual method must be used to differentiate the roll versus pitch versus thickness issues.

However, the limited capabilities of visual reference devices (e.g., an eyeball, camera, etc.) are based on line of sight, limit the best tolerance of the carriage arm to the tolerance limitations of the visual system. In addition, due to the reduced size of present hard disk drive components and further reduction goals of the hard disk drive and components, visual reference evaluation is quickly reaching its maximum limitations.

SUMMARY

An apparatus and method for automatically measuring characteristics of a hard disk drive carriage arm is disclosed. The method provides a first measuring device for automatically measuring a first side of a carriage arm. A second measuring device for automatically measuring an opposing side of the carriage arm is also provided. The second measuring device operates in conjunction with the first measuring device to cancel a measurement contact bias. Measurement data from the first measuring device and the measurement data from the second measuring device are provided to a computing device, wherein the measurement data is automatically stored and manipulated by the computing device.

BEST MODES FOR CARRYING OUT THE INVENTION

Reference will now be made in detail to the alternative embodiment(s)s of the present invention, an apparatus and method for automatically measuring characteristics of a hard disk drive carriage arm. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

The discussion will begin with an overview of a carriage arm in conjunction with its operation within a hard disk drive and components connected therewith. For purposes of clarity, the overview embodiment will provide one of a plurality of possible carriage arm setups. The discussion will then focus on embodiments of a method for automatically measuring the characteristics of a hard disk drive carriage arm in particular.

Figure 1:
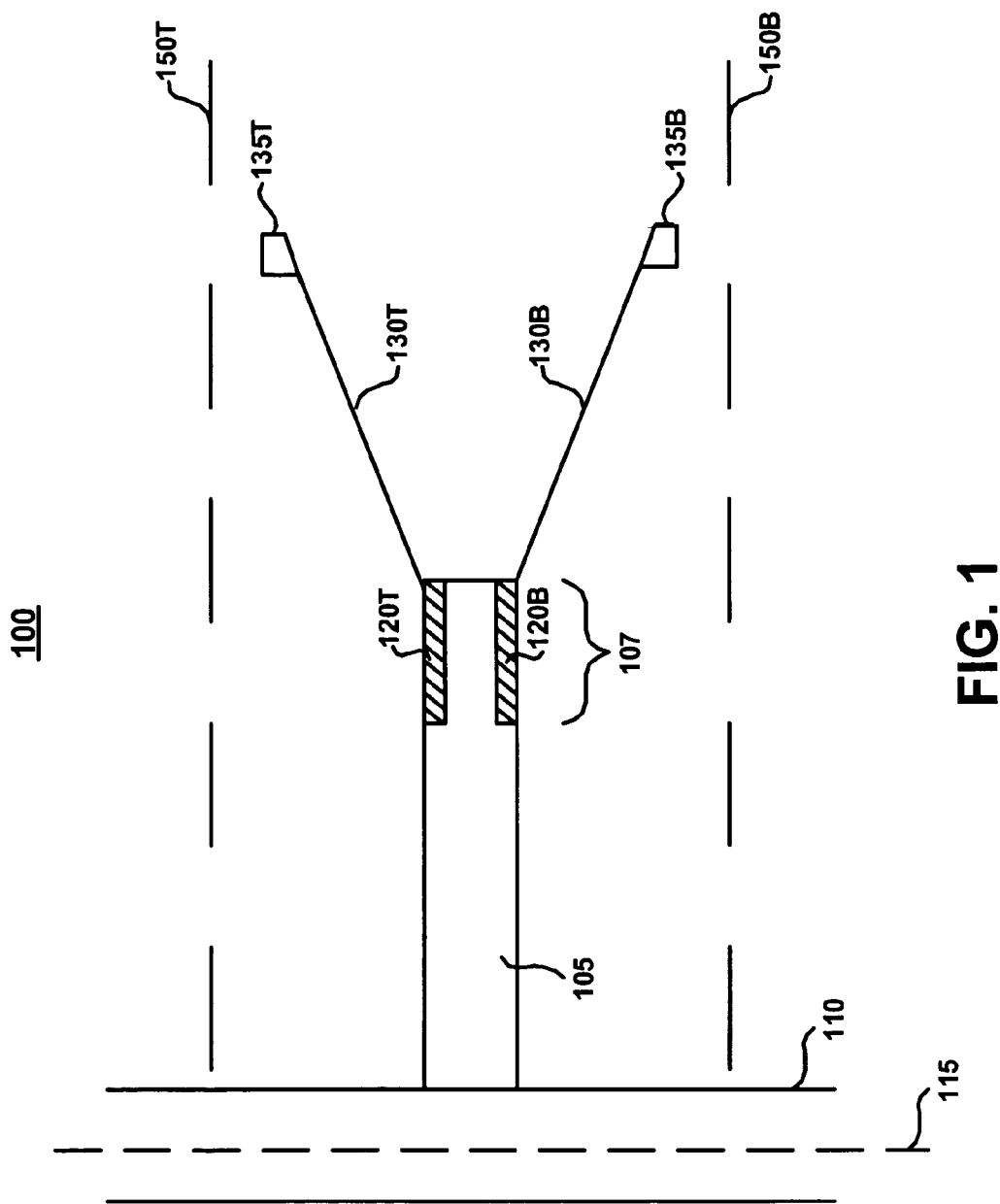
FIG. 1 is a diagram of an exemplary carriage assembly in accordance with one embodiment of the carriage/head assembly integrated with disks.

With reference now to FIG. 1, a carriage assembly 100 having a plurality of parallel carriage arms 105 (one shown) in the form of a comb that is movably or pivotally mounted to base 110 about a pivot assembly 115 (e.g., the center of rotation). In the embodiment shown, each arm 105 has at least one swage pad 120 at the tip portion 107 of the arm 105. In one embodiment, there are two swage pads 120, a top swage pad 120T and a bottom swage pad 120B. Each swage pad 120 has extending from it one cantilevered load beam and suspension 130 (two shown 130T for top and 130B for bottom). A magnetic read/write transducer or head assembly 135 (e.g., head 135T and 135B) is mounted on each suspension 130 (e.g., 130T and/or 130B).

The read/write heads 135T and 135B magnetically read data from and/or magnetically write data to disk 150 (e.g., disk 150T or 150B). The level of integration called the head gimbal assembly (HGA) 135 includes a head and a slider, which are mounted on suspension 130. The HGA 135 is usually bonded to the end of suspension 130. The head of the HGA 135 is typically pico size (approximately 1250×1000× 300 microns) and formed from ceramic or intermetallic materials. The head also may be of "femto" size (approximately 850×700×230 microns) and is pre-loaded against the surface of disk 150 (in the range two to ten grams) by suspension 130. Suspensions 130 have a spring-like quality, which biases or urges the air-bearing surface of the slider (of HGA 135) against the disk 150 to cause the slider to fly at a precise distance from the disk.

Figure 2:
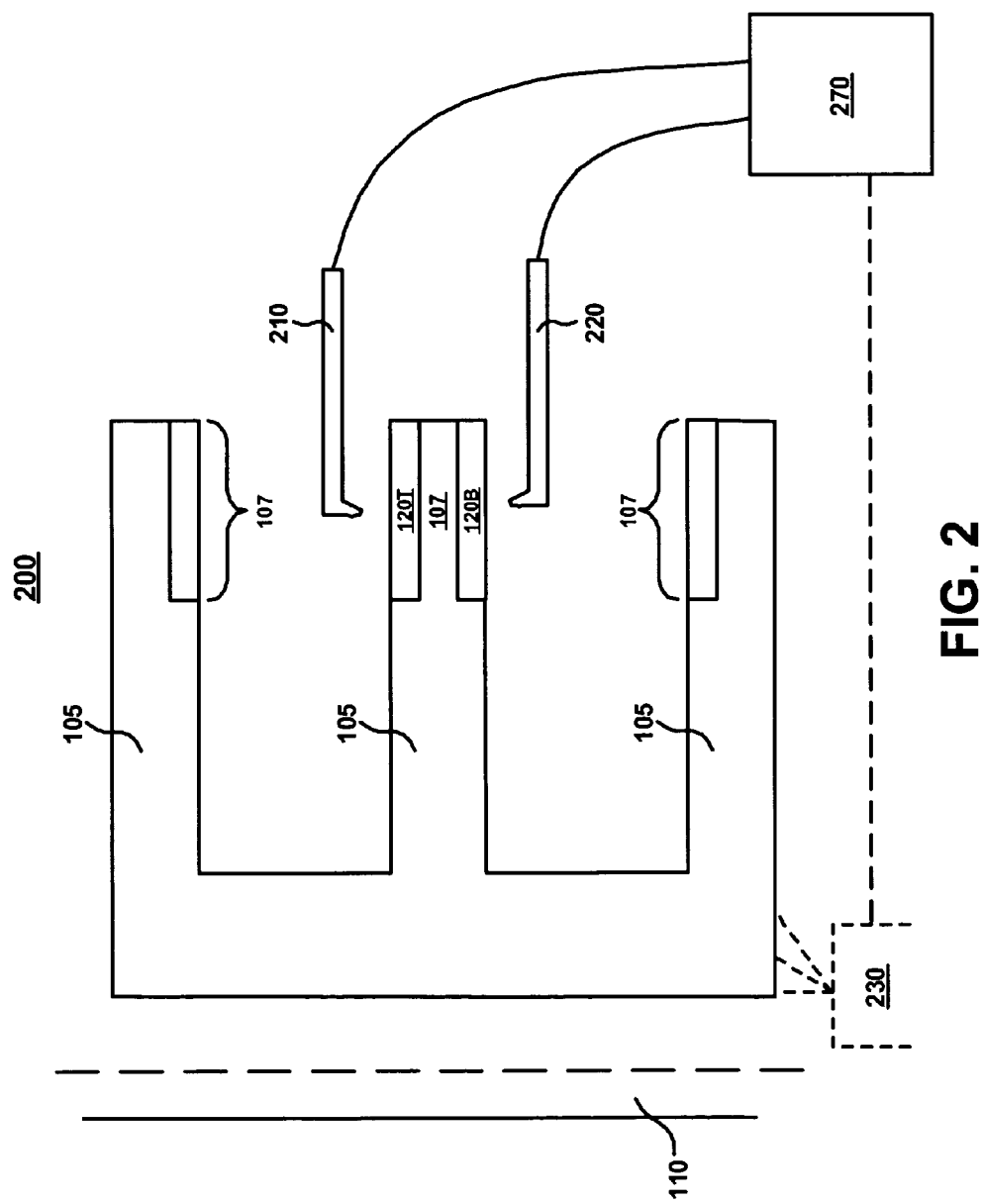
FIG. 2 is a side view of an exemplary carriage assembly and measuring device assembly in accordance with one embodiment of the present invention.

With reference now to FIG. 2, prior to the suspension 130 being attached to the swage pad portion 120, the entire carriage assembly 200, that is each carriage arm 105, is checked to ensure it is within manufacturing tolerances. As shown in the side view, in one embodiment, carriage assembly 200 has three carriage arms 105. Although three carriage arms are shown, the carriage assembly 200 may have as few as one or two carriage arm 105 or many more than three carriage arms 105. The use of three carriage arms 105 in the present embodiment is merely for purposes of clarity.

A first measuring device 210 and a second measuring device 220 are also shown in FIG. 2. In one embodiment, first measuring device 210 and second measuring device 220 are electronic digital indicators. In one embodiment, each carriage arm 105 is measured three or more times by both the first measuring device 210 and the second measuring device 220 to establish enough readings to mathematically calculate a plane. Further discussion of the operation of the first and second measuring devices is found in the discussion of FIG. 4. In one embodiment, once the measuring devices make a measurement, the measurement information is passed to a computing device 270. The computing device 270 then calculates any or all of a plurality of tolerances including thickness, pitch and roll of the carriage arm 105.

In one embodiment, the first measuring device 210 and second measuring device 220 have a plurality of probes for performing the three or more measurements at the same time. In another embodiment, the first measuring device 210 and second measuring device 220 have a single probe and the probe must be moved each time for performing the three or more measurements. In yet another embodiment, the first measuring device 210 and second measuring device 220 have any number of probes and the three or more measurements are performed at the same time or at different times. In yet another embodiment, there are a plurality of first measuring devices 210 and second measuring devices 220 for performing the measurements on more than one carriage arm 105 at the same time. Furthermore, in one embodiment, the carriage arm 105 is brought to a stationary first measuring device(s) 210 and second measuring device(s) 220. In another embodiment, the carriage arm 105 is stationary and the first measuring device(s) 210 and second measuring device(s) 220 may be brought to the carriage arm 105. In yet another embodiment, the carriage arm 105 and the first measuring device(s) 210 and second measuring device(s) 220 are all mobile.

With reference still to FIG. 2, in one embodiment, an optional laser 230 or electronic digital indicator (EDI) is used to establish a datum with respect to the base of the carriage assembly 200. For example, as the base 110 of carriage assembly 200 is positioned, laser 230 performs a laser measurement. The measurement provides a baseline or datum (e.g., true zero) which is used by the computing device 270 in conjunction with the information received from the first measuring device 210 and second measuring device 220. By utilizing the laser measurement, the computing device 270 can calculate any offsets with respect to carriage assembly 200 placement and therefore form a closed loop system, wherein all the necessary information is automatically provided to the computing device 270.

Figure 3:
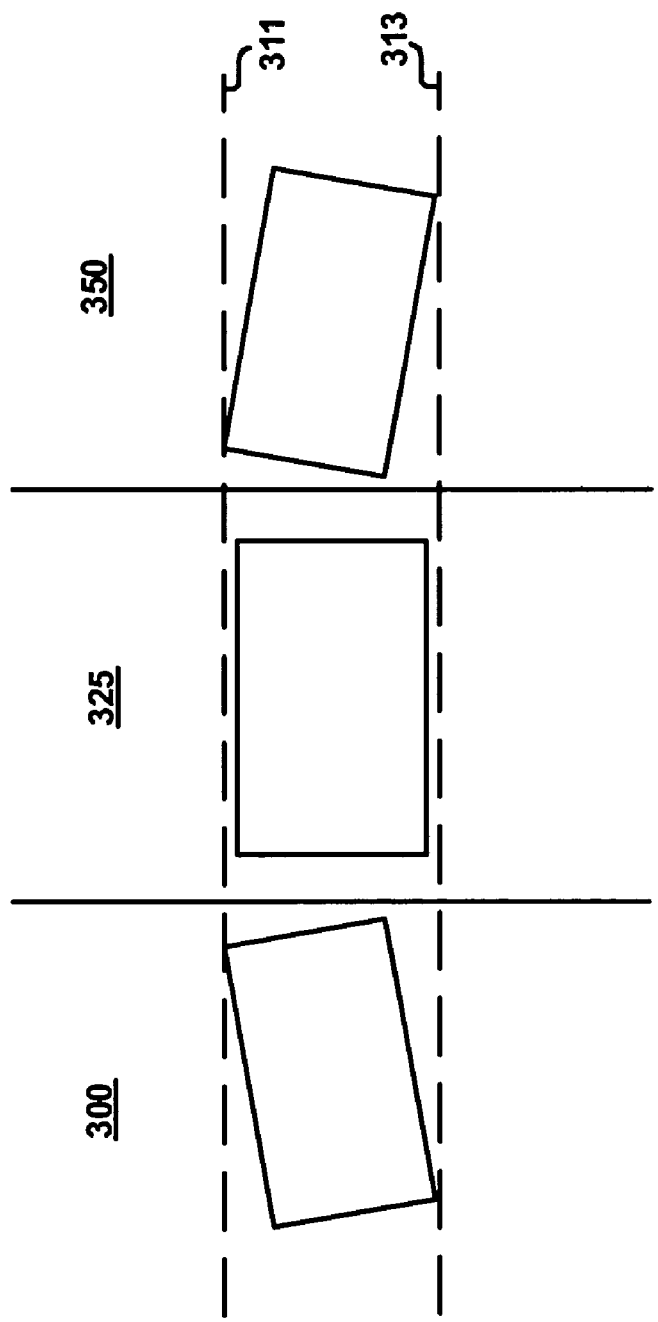
FIG. 3 is a plurality of front views of exemplary carriage arm tip shapes in accordance with one embodiment of the present invention.

With reference now to FIG. 3, a plurality of possible configurations of the swage pad 120 at the tip portion 107 of the arm 105 are shown. In each of the figures, a set of datums 311 and 313 are utilized to show the same location and size across a few of the plurality of possible proper and improper configurations. In one embodiment, as shown in the carriage arm tip 300, a roll to the right is shown, carriage arm tip 325 has no roll but completely fills the area between datum 311 and 313, and carriage arm tip 350 illustrates a roll to the left. If a datum tolerance measurement such as that of datum 311 and 313 were the only method used to analyze the carriage arms of carriage arm tips 300, 325 and 350, each would be within the tolerance set by the datum, although only the middle carriage arm tip 325 is correctly aligned.

Figure 4:
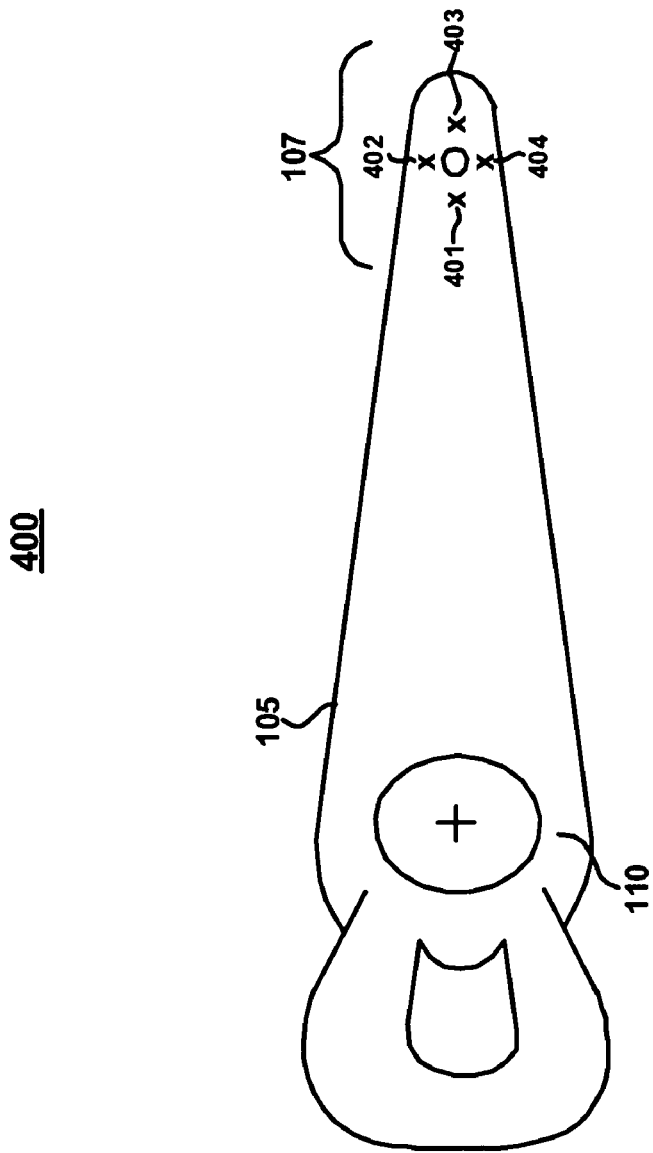
FIG. 4 is a top view of an exemplary carriage arm in accordance with one embodiment of the present invention.

With reference now to FIG. 4, a top view of a carriage assembly 400 is shown in conjunction with one embodiment for automatically measuring the characteristics of a hard disk drive carriage arm. Specifically, a plurality of locations on the tip portion 107 (e.g., the swage pad area 120) is automatically measured to generate a plane for analysis of the thickness, roll and pitch of each carriage arm 105 in the assembly 400. For example, by taking measurement of three or more points on a surface, a plane of the surface can be generated. From the generated plane, an analysis of the thickness, roll and pitch can be performed.

Additionally, by measuring both sides of the carriage arm 105 simultaneously, measurement contact bias is also reduced. That is, if the measurement is taken by contacting the swage pad 120 surface, by contacting both sides at the same time with the same pressure, offset caused by the measuring device is negligible. In one embodiment, four measurements are taken on each surface. Although three are all that are necessary for evaluating a plane, any number of three or more locations may be used to evaluate a plane. In one embodiment, by utilizing four measurement locations the mathematics is simplified. That is, the present use of four locations is merely for purposes of illustrating the mathematics in its simplest form. Any number of locations (e.g., three or more) may be used within the bounds of the invention.

Referring still to FIG. 4, the following equations are one set of the plurality of possible mathematical equations which may be used for roll, pitch and thickness calculations. As stated herein, the equations are based on four measured locations only for purposes of clarity and brevity. Each equation may be extrapolated for use on any number (e.g., three or more) of measurements.

In one embodiment, pitch is calculated using the measurement of 403 minus the measurement of 401 or vice-versa. Roll is calculated using the measurement of 402 minus the measurement of 404 or vice-versa. Thickness is calculated using the top measurements (one or more) minus the bottom measurements (one or more) or vice-versa.

Figure 5:
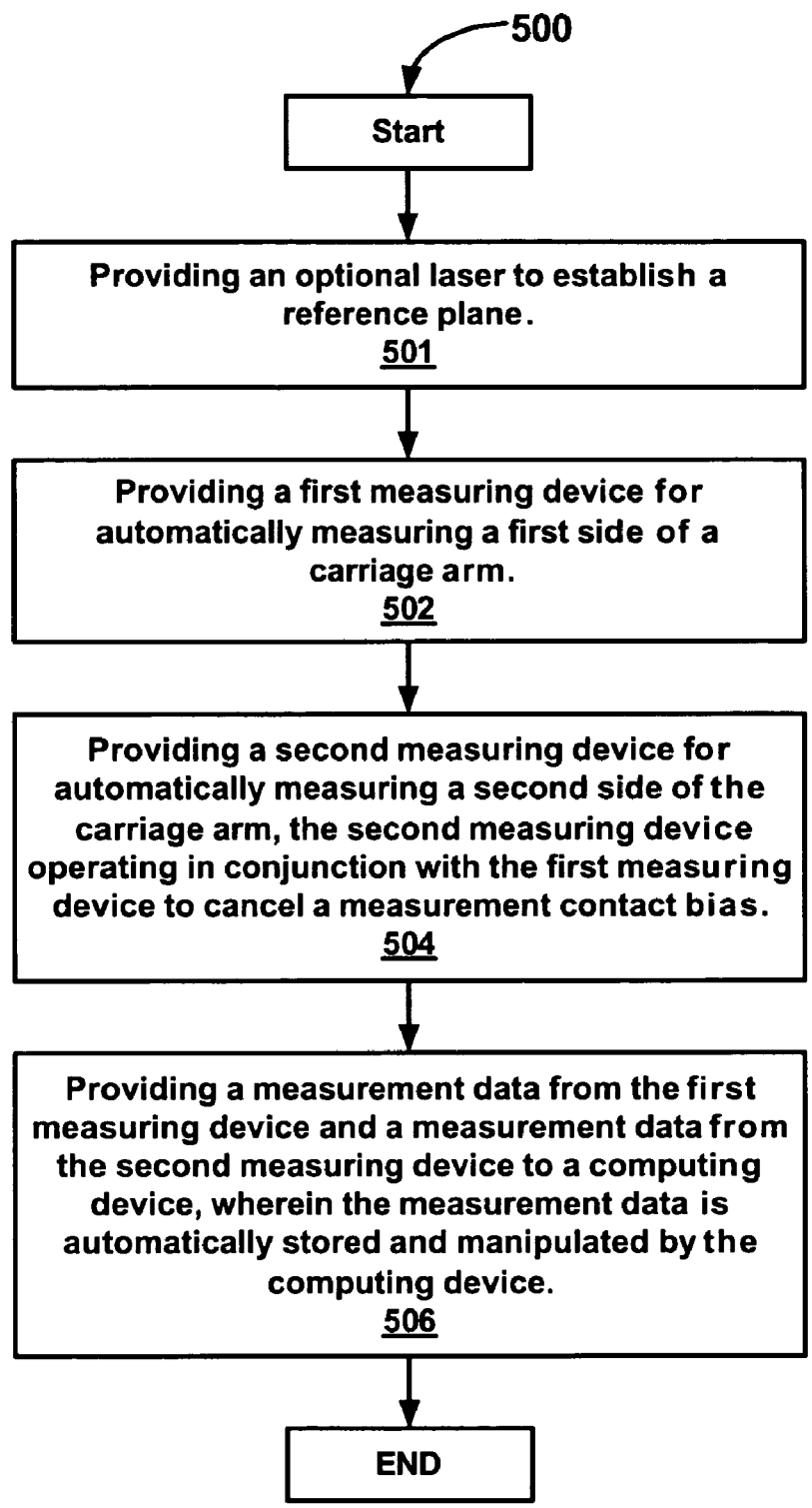
FIG. 5 is a flowchart of a method for automatically measuring characteristics of a hard disk drive carriage arm in accordance with one embodiment of the present invention.

With reference now to FIG. 5, a flowchart 500 of a method for automatically measuring characteristics of a hard disk drive carriage arm is shown. The measurements are performed on the carriage arm 105 of FIG. 1 prior to installation within a hard disk drive. Additionally, in one embodiment, the measurements are performed prior to the attachment of any suspension elements 130.

With reference now to optional step 501 of FIG. 5 and to FIG. 2, one embodiment provides an optional laser 230 to establish the plane of reference. For example, the optional laser 230 will be used in conjunction with the first measuring device 210 and second measuring device 220 by said computing device 270. In another embodiment, the optional laser 230 is an electronic digital indicator.

Referring now to step 502 of FIG. 5 and to FIG. 2, one embodiment provides a first measuring device 210 for automatically measuring a first side 120T of a carriage arm 105. In one embodiment, the first measuring device 210 measures the roll component of the carriage arm 105 automatically. In another embodiment, the first measuring device 210 measures the roll, pitch and thickness of the carriage arm 105 automatically.

With reference now to step 504 of FIG. 5 and to FIG. 2, one embodiment provides a second measuring device 220 for automatically measuring a second side 120B of the carriage arm 105. In one embodiment, the second measuring device 220 measures the roll component of the carriage arm 105 automatically. In another embodiment, the second measuring device 220 measures the roll, pitch and thickness of the carriage arm 105 automatically.

Additionally, the second measuring device 220 operates in conjunction with the first measuring device 210 to cancel measurement contact bias. For example, in order to take a measurement the first measuring device 210 must touch the carriage arm and apply a small force (e.g., 7 grams, 1 gram, 0.5 grams, etc.). This force is enough to interfere with the measurements being taken. However, by utilizing a second measuring device 220 applying the same small force on the opposing side at the same time, the forces are cancelled and any measurement interferences are removed. Therefore, as long as both measurement devices apply the same force, the force component applied to the carriage arm 105 by the probe of the measurement device is removed from the calculation.

Referring now to step 506 of FIG. 5 and to FIG. 2, one embodiment provides the measurement data from the first measuring device 210 and the measurement data from the second measuring device 220 to a computing device 270 for evaluation. In one embodiment, the measurement data is automatically provided to the computing device 270. That is, the computing device 270 is communicatively coupled with the first measuring device 210 and the second measuring device 220 and receives the measurements therefrom without user interaction. In one embodiment, the connection between the measuring devices and the computing system 270 is a wired connection. In another embodiment, the connection between the measuring devices and the computing system 270 is a wireless connection.

Thus, embodiments of the present invention provide, a method and system for automatically measuring characteristics of a hard disk drive carriage arm. Additionally, embodiments provide a method and system for automatically measuring characteristics of a hard disk drive carriage arm which can automatically measure the height, pitch and roll of the carriage arm without introducing measurement deflection to the carriage arm. Embodiments of the present invention further provide tighter carriage arm tolerance capability resulting in more efficient carriage assemblies and hard disk drives.

While the method of the embodiment illustrated in flow chart 500 shows specific sequences and quantity of steps, the present invention is suitable to alternative embodiments. For example, not all the steps provided for in the methods are required for the present invention. Furthermore, additional steps can be added to the steps presented in the present embodiment. Likewise, the sequences of steps can be modified depending upon the application.

The alternative embodiment(s) of the present invention, a method and system for automatically measuring characteristics of a hard disk drive carriage arm, is thus described. While the present invention has been described in particular embodiments, it should be appreciated that the present invention should not be construed as limited by such embodiments, but rather construed according to the below claims.

What is claimed is:

1. A method for automatically measuring characteristics of a hard disk drive carriage arm comprising:

providing a datum for a carriage arm to a computing device;

utilizing a first measuring device to automatically perform at least three measurements on a first side of the carriage arm;

providing said at least three measurements from said first measuring device to said computing device;

utilizing said at least three measurements of said first side of said carriage arm in conjunction with said datum provided to said computing device to generate a first plane representing said first side of said carriage arm;

utilizing a second measuring device, independent of said first measuring device, to automatically perform at least three measurements on a second side of the carriage arm;

providing said at least three measurements from said second measuring device to said computing device; and utilizing said at least three measurements of said second side of said carriage arm in conjunction with said datum provided to said computing device to generate a second plane representing said second side of said carriage arm.

2. The method as recited in claim 1 wherein the first measuring device further comprises:
measuring the roll of said carriage arm automatically.

3. The method as recited in claim 2 wherein the first measuring device further comprises:
measuring the pitch and thickness of said carriage arm automatically.

4. The method as recited in claim 3 wherein the second measuring device further comprises:
measuring the roll, pitch and thickness of said carriage arm automatically.

5. The method as recited in claim 1 further comprising:
selecting four locations to obtain said measurement data for each side of said carriage arm.

6. The method as recited in claim 1 further comprising:
providing a laser for establishing the datum for said carriage arm being measured.

7. The method as recited in claim 1 wherein said first measuring device and said second measuring are electronic digital indicators (EDI's).

8. A measuring device for automatically measuring characteristics of a hard disk drive carriage arm comprising:
a datum provider automatically providing a datum to a computing device;
a first measuring device automatically measuring at least three locations on a first side of a carriage arm and providing said measuring of said at least three locations to said computing device to generate a first plane representing said first side of said carriage arm; and
a second measuring device, independent of said first measuring device, automatically measuring at least three locations on a second side of the carriage arm and providing said measuring of said at least three locations to said computing device to generate a second plane representing said second side of said carriage arm.

9. The measuring device of claim 8 wherein the first measuring device measures the roll of said first side of said carriage arm automatically.

10. The measuring device of claim 9 wherein the first measuring device measures the pitch and thickness of said first side of said carriage arm automatically.

11. The measuring device of claim 10 wherein the second measuring device measures the roll, pitch and thickness of said second side of said carriage arm automatically.

12. The measuring device of claim 11 wherein said first measuring device and said second measuring device automatically select four locations to obtain said measurement data for each side of said carriage arm.

13. The measuring device of claim 8 further comprising:
an electronic digital indicator (EDI) for establishing the datum for said carriage arm being measured.

14. The measuring device of claim 8 wherein said first measuring device and said second measuring are electronic digital indicators (EDI's).

15. A method for automatically measuring characteristics of a hard disk drive carriage arm comprising:
utilizing a first measuring device to automatically perform at least three measurements on a first side of a carriage arm and provide said at least three measurements of said first side of said carriage arm to a computing device;
utilizing a second measuring device, independent of said first measuring device, to automatically perform at least three measurements on a second side of the carriage arm and provide said at least three measurements of said second side of said carriage arm to said computing device, said second measuring device operating in conjunction with said first measuring device to cancel a measurement contact bias;
utilizing an electronic digital indicator (EDI) to establish a datum for said carriage arm and provide said datum to said computing device utilizing, at said computing device, said at least three measurements of said first side of said carriage arm in conjunction with said datum to generate a first plane representing said first side of said carriage arm; and
utilizing, at said computing device, said at least three measurements of said second side of said carriage and in conjunction with said datum to generate a second plane representing said second side of said carriage arm.

16. The method as recited in claim 15 further comprising:
measuring least four locations on said first side of said carriage arm to establish a first plane on said first side of said carriage arm; and
measuring at least four locations on said second side of said carriage arm to establish a second plane on said second side of said carriage arm.

17. The method as recited in claim 16 wherein said computing device further comprises:
utilizing the first plane to calculate the roll of said first side of said carriage arm automatically.

18. The method as recited in claim 17 wherein the computing device further comprises:
utilizing the first plane to calculate the pitch and thickness of said first side of said carriage arm automatically.

19. The method as recited in claim 16 wherein the computing device further comprises:
utilizing the second plane to calculate the roll of said second side of said carriage arm automatically.

20. The method as recited in claim 19 wherein the computing device further comprises:
utilizing the second plane to calculate the pitch and thickness of said second side of said carriage arm automatically.

21. The method as recited in claim 15 wherein said first measuring device and said second measuring device are electronic digital indicators (EDI's).

* * * * *